(12) United States Patent
Gomez et al.

(10) Patent No.: US 8,505,244 B2
(45) Date of Patent: Aug. 13, 2013

(54) MODULAR TOWER STRUCTURE FOR EOLIC TURBINES AND OTHER APPLICATIONS

(75) Inventors: Miguel Angel Fernandez Gomez, Madrid (ES); Jose Emilio Jimeno Chueca, Madrid (ES)

(73) Assignee: Inne021 S.L., Madrid (ES)

( * ) Notice: Subject to any disclaimer, the term of this patent is extended or adjusted under 35 U.S.C. 154(b) by 1508 days.

(21) Appl. No.: 11/303,616

(22) Filed: Dec. 15, 2005

(65) Prior Publication Data

US 2006/0156681 A1    Jul. 20, 2006

(51) Int. Cl.
*E04H 12/12* (2006.01)
*E04H 12/16* (2006.01)
*E04G 21/14* (2006.01)

(52) U.S. Cl.
USPC .............................. 52/40; 52/223.5; 52/745.18

(58) Field of Classification Search
USPC .............. 52/FOR. 118, FOR. 119, FOR. 152, 52/40, 745.17, 745.18, 848, FOR. 218, 223.4, 52/223.5
See application file for complete search history.

(56) References Cited

U.S. PATENT DOCUMENTS

| | | | | |
|---|---|---|---|---|
| 1,069,328 A | * | 8/1913 | Griffin | 52/295 |
| 2,958,983 A | * | 11/1960 | Hoover | 52/396.02 |
| 4,196,551 A | * | 4/1980 | Bondarenko et al. | 52/223.3 |
| 5,038,540 A | * | 8/1991 | Krautz | 52/245 |
| 7,464,512 B1 | * | 12/2008 | Perina | 52/651.01 |
| 2005/0120644 A1 | * | 6/2005 | Tadros et al. | 52/155 |
| 2005/0129504 A1 | * | 6/2005 | De Roest | 415/4.2 |
| 2005/0166521 A1 | * | 8/2005 | Silber | 52/633 |

FOREIGN PATENT DOCUMENTS

| | | |
|---|---|---|
| ES | 1058539 U | 12/2004 |
| ES | U 200402304 | 3/2005 |
| ES | 1058539 Y | 4/2005 |

* cited by examiner

*Primary Examiner* — Michael Safavi
(74) *Attorney, Agent, or Firm* — K&L Gates LLP

(57) ABSTRACT

A tower structure for a wind energy turbine, wind power, renewable energy, and other uses made of concrete, steel-reinforced concrete or other materials, and a method of manufacture thereof are described. The structure includes several pre-fabricated tower lengths, each tower length having at least three pre-fabricated wedges, such that a central protruding edge of each wedge approaches or lies at a center line of the tower structure when assembled. Tower lengths higher in the tower may be narrower and may be made up of fewer wedges than lower tower lengths. Each tower length may also include several apertures or channels adapted to accommodate a cable joining all the tower lengths of the tower. Also, tower lengths may have a circular or polygonal outer ring made up of bracing elements, each bracing element arranged when assembled to brace one or more wedges.

18 Claims, 7 Drawing Sheets

MODULAR TOWER STRUCTURE FOR EOLIC TURBINES AND OTHER APPLICATIONS

BACKGROUND

Example embodiments of the present invention provide an improved modular tower structure for eolic turbines, including a novel and original support tower structure for turbines which generate electric energy and other applications.

For this reason, the some example embodiments will be of special interest to the industrial energy sector and specially for the eolic generation of electricity, as well as for the specialized industry in civil works related to the eolic sector.

At present, the development of eolic energy is well known, as a source for generation of electric energy of renewable origin. This consists of the exploitation of the wind energy. Long ago, it was used to propel sailing ships and for moving grain wind mills. Today it is used above all to generate safe and clean energy.

Eolic energy has experienced important advances in the last few years, especially in Europe, where Germany, Spain and Denmark lead with an installed capacity of more than 9 TW, 6 TW and 3 TW respectively.

In order to achieve such a degree of development, it has been necessary to develop new technologies, making possible an improvement in turbine power, from hundreds of kW up to 2000 kW, in the machines which are currently being installed and even more in the ones which are being designed with a power capacity of 3000 to 6000 kW, with blades up to 45 m long.

This has justified the construction of towers of great height in order to support the engine gondola where the air generator turbine is located, some reaching up to 100 meters in height or more.

BRIEF SUMMARY OF EXAMPLE EMBODIMENTS OF THE INVENTION

Due to transportation problems, the above mentioned towers are manufactured with some limitations in diameter and length, being constructed in lengths linked to each other. For this reason, they are usually metallic ones, manufactured using curved steel sheet and they are also electro-welded in order to have a cylindrical shape, and they are likewise welded to both flanges on their ends, through which the different lengths of the tower are linked and fixed by means of screws. For this reason, their diameter normally does not exceed 4.20 m.

On the other hand, the cost increase in the price of steel is a factor which makes considering other alternatives necessary in terms of the material used, with the use of concrete being the preferred alternative. Construction systems have been developed for concrete truncated-conical towers with larger diameters than the metallic ones allowing them to reach greater heights.

The concrete towers would allow at the same time to reach greater heights, lower construction costs and would be longer-lasting than steel, minimizing maintenance work. Likewise, because they weight more than steel, they allow for reduction in the size of the bedplates and therefore making them more cost effective.

Finally, concrete not being a conducting material, it does not have electrical insulating problems nor communication interferences.

Example embodiments of the present invention provide for an improved modular tower structure for eolic turbines and other applications, and facilitate the use of prefabricated concrete structures, metallic or mixed, for this specific purpose, by means of a special structure which substantially simplifies the transport, installation and assembly, improving the technical capabilities available at the present State of the Art and with an important reduction in cost.

To this end, a tower set is divided by horizontal and vertical sections in modules of transportable sizes and weights. Each one of these prefabricated concrete, metallic or mixed modules, can be made up of a revolution surface with a straight or curved generatrix, or by straight or curved section linear elements.

An example improved modular tower structure made of concrete, metal or mixed ones, for eolic turbines and other applications, which is described below, is made up of a plurality of prefabricated elements of different textures (smooth, rough or stamped) of transportable dimensions and weights creating a set with closed superficial appearance forming a revolution surface with a straight or curved generatrix, or a set of open lattice appearance with linear elements inscribed in an ideal revolution surface of curved or straight generatrix.

In order to obtain the breaking up of elements, the tower is divided into circular horizontal sections in several limited height lengths in order to be transportable. At the same time, each limited height length is divided into vertical sections in elements which, in transport position, have dimensions and weights capable of being transported by road. The number of vertical sections (e.g., 2, 3, 4, 5, 6, 7, 8, etc. . . . ) provides elements of half section, one-third section, one-fourth section, one-fifth section, one-sixth section, one-seventh section, one-eighth section, etc., linked together by vertical joints resolved as wet joints or as stitched joints with bars or pre-stressed cables around a rim. Each set of, e.g, 2, 3, 4, 5, 6, 7, 8, etc. . . . elements makes up a length of limited height between horizontal joints. Thus, the lower lengths of the tower, of larger diameter, would be made up of more elements, for example, with one eighth section length, while the upper ones, with less diameter, will be made up of simply two elements, or even with just one metallic or mixed element.

The linking among the elements of each length can be achieved through wet vertical joints which require the use in site of small formworks and the "in situ" casting of a small volume of concrete, or through vertical joints stitched together with pre-stressed bars, or through penetration openings housed in the concrete structure of said elements, by which the stressed penetration bars are fixed, forming in this way lengths of prefabricated concrete made up of various transversal elements which are more easily transportable than the current metallic elements due to their smaller dimensions.

Likewise, the various tower lengths made up in this way are linked together by flanges using an interior rim in the outer edges, provided with a plurality of openings through which the metallic fastening bars or cables pass which are stressed through nuts on both sides of the flange.

Additionally, instead of the previous solution, the various tower lengths made up in this way may also be linked together through flanges provided with a plurality of openings which are passed through by a set of metallic cables between the flange of the length in question and the bedplate of the tower base, passing said cables through all of the other flanges of the intermediate lengths, in this way creating in the interior of the tower an outer or inner pre-stressed element besides the concrete.

On the other hand, in the previous flanges the linking between tower lengths, the edges adopt a dovetail profile, facilitating the fit between lengths.

In addition, instead of the above mentioned solutions, the different tower lengths are also linked together through a system of steel bars projecting from one length, which are housed into channels left to this effect in the other length, establishing the linking through channels or casings filled up with retraction-free, fluid and high resistance mortar. The projecting bars will be parallel and vertical, located at the exact distance corresponding to the location of the outer end of the casings. These, however, may not be vertical since they are located on the inclined surface of the concrete elements. The flexibility of the steel bars will allow the penetration and adaptation of the shape of the bars to the shape of the channels or casings. These bars shall be corrugated in order to provide the desired adherence. If it is necessary, the end of each bar may end in a ball facilitating the sliding into the full length of the casing during its introduction and creating another anchorage in addition to the adherence along the length of the bar.

In the case of straight or curved linear elements forming open lattice, each length of limited height is made up of various quasi-vertical linear elements (adapted to the ideal truncated conical surface of straight or curved generatrix) and by a ring of circular or polygonal linear elements serving as bracing at the level of each horizontal joint. Each ring can be made up of one or several straight, horizontal linear elements (in the case of polygonal rings) or curved ones (in the case of circular rings).

The linking can be achieved through a system of steel bars projecting from each quasi-vertical element of a length, which crosses conducting channels placed for this purpose in the circular or polygonal horizontal elements, and are housed and rest finally in casings located in the quasi-vertical elements of the other length. In this case, the bars and channels or casings are parallel to each other making it unnecessary to strain the bars upon being introduced into the channels. The linking is achieved, likewise, with fluid retraction-free high resistance mortar.

In addition, the upper lengths, smaller in size, may be metallic or mixed instead of prefabricated concrete.

BRIEF DESCRIPTION OF THE SEVERAL VIEWS OF THE DRAWINGS

Below, you will find the drawings in which are represented, as a non limitative way of example, some example embodiments of the present invention, which are susceptible of all those changes in detail which do not suppose a fundamental change in the essential characteristics of the above mentioned improvements.

Such drawings illustrate:

In FIG. 1C: A cross-sectional view of a tower element, including segmentation lines illustrating how the element is divided into segments, in accordance with an example embodiment of the present invention.

In FIG. 1D: A cross-sectional view of a tower element, including segmentation lines illustrating how the element is divided into segments, in accordance with an example embodiment of the present invention.

In FIG. 1E: A cross-sectional view of a tower element, including segmentation lines illustrating how the element is divided into segments, in accordance with an example embodiment of the present invention.

In FIG. 1F: A cross-sectional view of a tower element, including segmentation lines illustrating how the element is divided into segments, in accordance with an example embodiment of the present invention.

In FIG. 1G: A cross-sectional view of a tower element, including segmentation lines illustrating how the element is divided into segments, in accordance with an example embodiment of the present invention.

DETAILED DESCRIPTION OF EXAMPLE EMBODIMENTS OF THE INVENTION

Figures 1A, 1B:
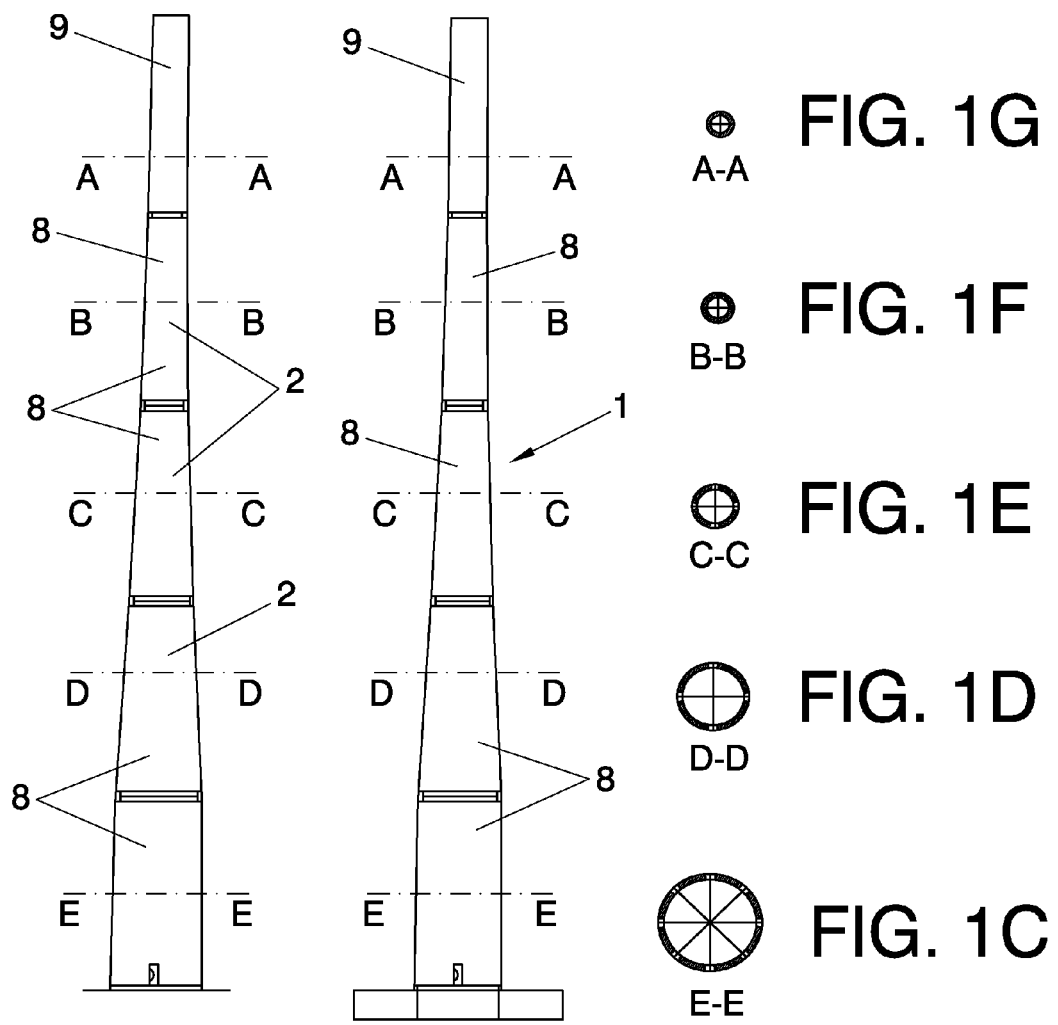
In FIG. 1A: Front view of an improved parabolic concrete modular tower structure for eolic turbines and other applications showing detail of the section lengths, in accordance with an example embodiment of the present invention in which the top tower element is made of metal.
In FIG. 1B: Front view of an improved parabolic concrete modular tower structure for eolic turbines and other applications showing detail of the section lengths, in accordance with an example embodiment of the present invention in which the top tower element is made of metal.
Figure 2B:
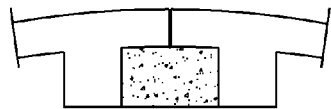
In FIG. 2B: A detailed view of linking flanges, showing the linking of two adjacent segments by mortar.
Figure 2D:
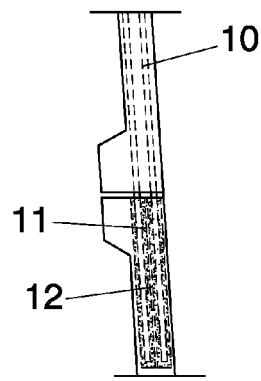
In FIG. 2D: A detailed view of linking flanges, showing the linking of two adjacent elements by a plurality of corrugated steel bars projecting vertically out of one of the first and second tower elements, and a plurality of channels formed in the other tower element, wherein the steel bars extend into the channels joining the tower elements.
Figure 2E:
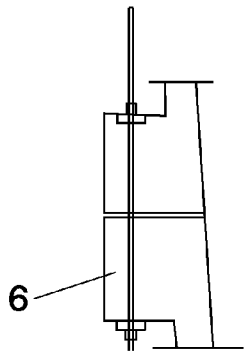
In FIG. 2E: A detailed view of linking flanges, showing the linking of two adjacent elements by a fastener.
Figure 2C:
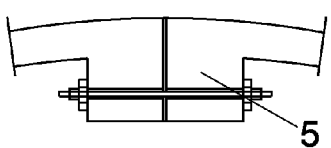
In FIG. 2C: A detailed view of linking flanges, showing the linking of two adjacent segments by a channel adapted to accommodate a joining element.
Figure 2A:
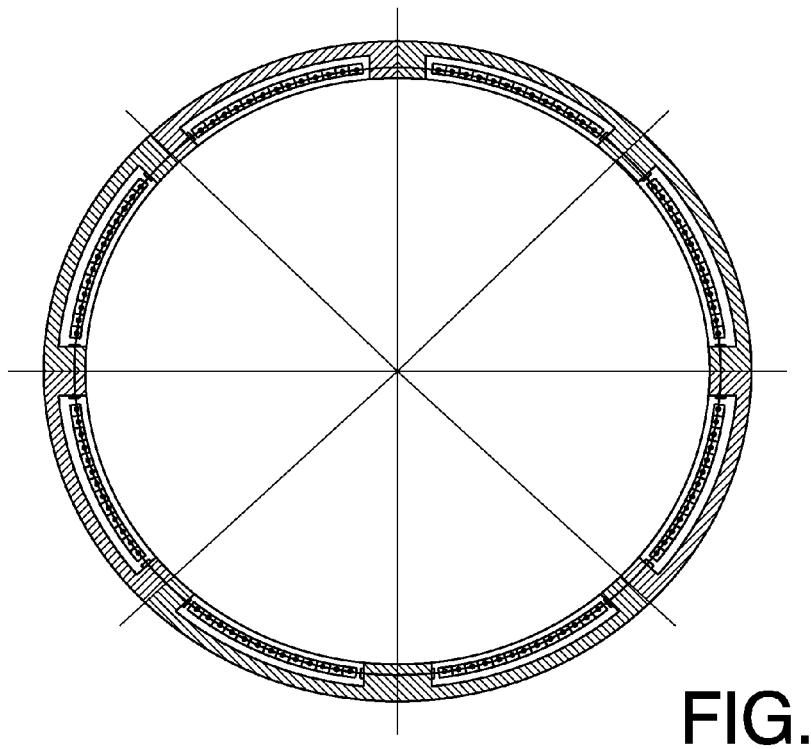
In FIG. 2A: Detailed view of a section of a length of the improved modular tower structure for eolic turbines and other applications, including segmentation lines illustrating how the element is divided into segments, in accordance with an example embodiment of the present invention.
Figure 3A:
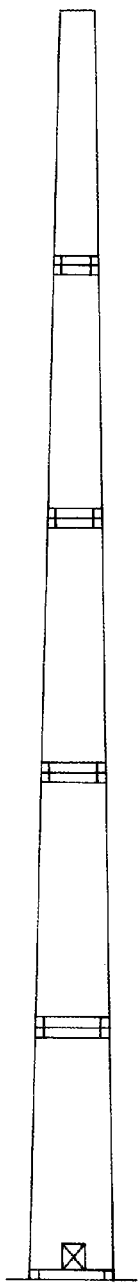
In FIG. 3A: Front view of an improved truncated conical concrete modular tower structure for eolic turbines and other applications, in accordance with an example embodiment of the present invention.
Figure 3B:
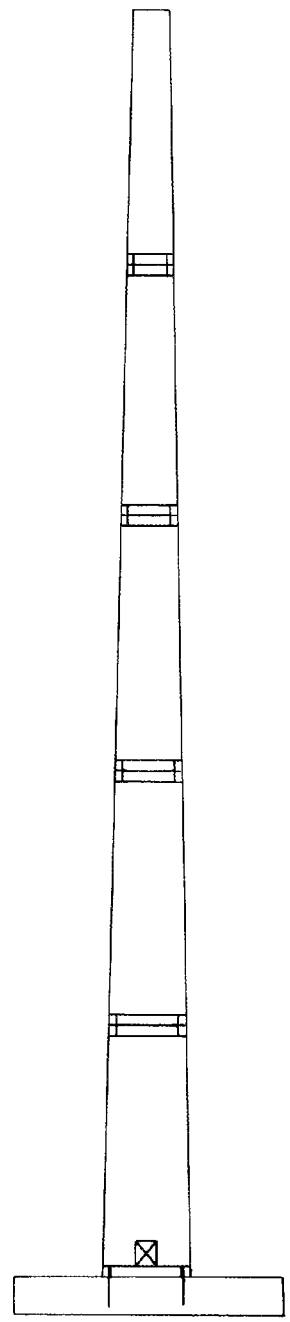
In FIG. 3B: Front view of an improved truncated conical concrete modular tower structure for eolic turbines and other applications, shown attached to a mounting pad, in accordance with an example embodiment of the present invention.
Figure 4B:
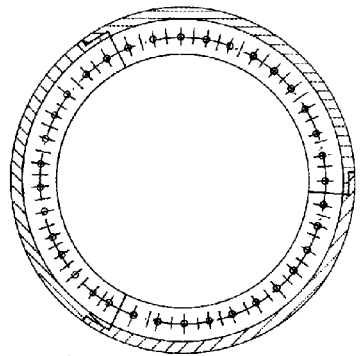
In FIG. 4B: Detailed view of a section of an improved concrete modular tower structure for eolic turbines and other applications, in accordance with an example embodiment of the present invention.
Figure 4F:
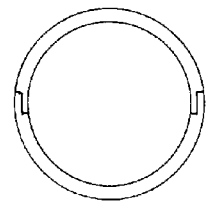
In FIG. 4F: Detailed view of a section of an improved concrete modular tower structure for eolic turbines and other applications, in accordance with an example embodiment of the present invention.
Figure 4C:
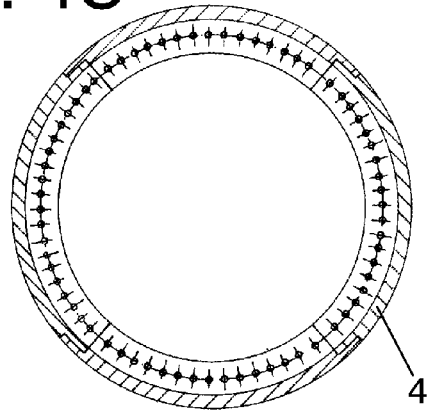
In FIG. 4C: Detailed view of a section of an improved concrete modular tower structure for eolic turbines and other applications, in accordance with an example embodiment of the present invention.
Figure 4E:
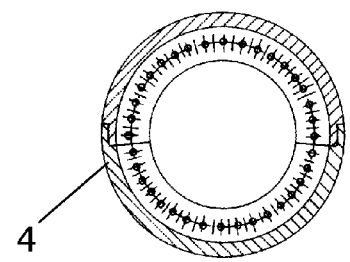
In FIG. 4E: Detailed view of a section of an improved concrete modular tower structure for eolic turbines and other applications, in accordance with an example embodiment of the present invention.
Figure 4A:
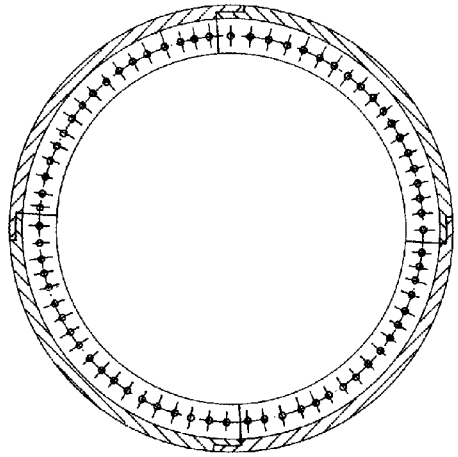
In FIG. 4A: Detailed view of a section of an improved concrete modular tower structure for eolic turbines and other applications, in accordance with an example embodiment of the present invention.
Figure 4D:
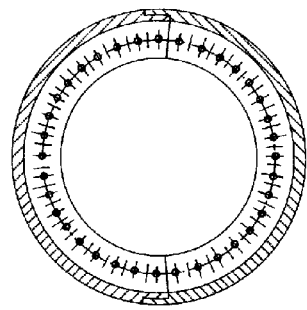
In FIG. 4D: Detailed view of a section of an improved concrete modular tower structure for eolic turbines and other applications, in accordance with an example embodiment of the present invention.
Figure 5A:
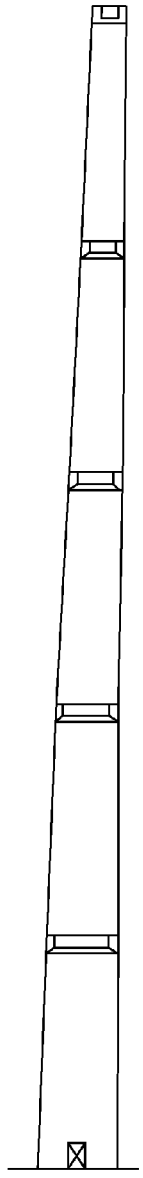
In FIG. 5A: Front view of an improved concrete modular tower structure for eolic turbines and other applications, in accordance with an example embodiment of the present invention.
Figure 5B:
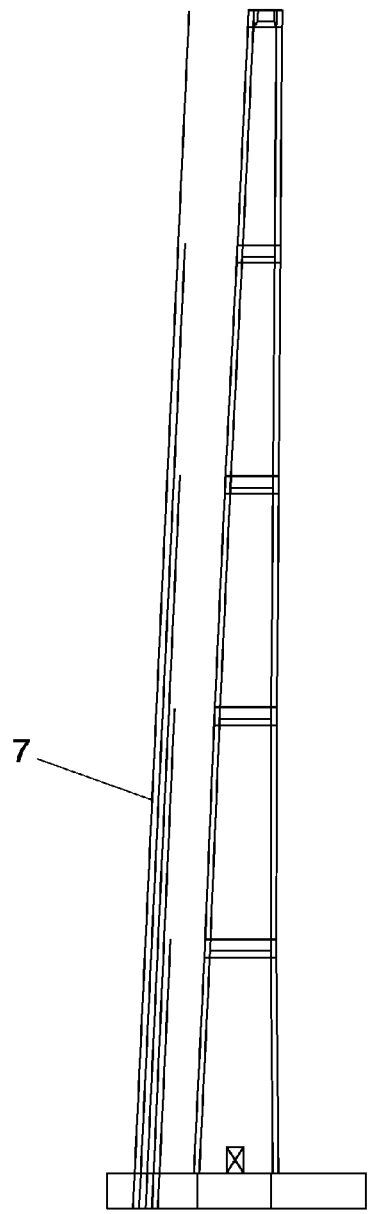
In FIG. 5B: Front view of an improved concrete modular tower structure for eolic turbines and other applications, illustrating the length of the fixation cables used in the tower against the height of the tower, in accordance with an example embodiment of the present invention.
Figure 5C:
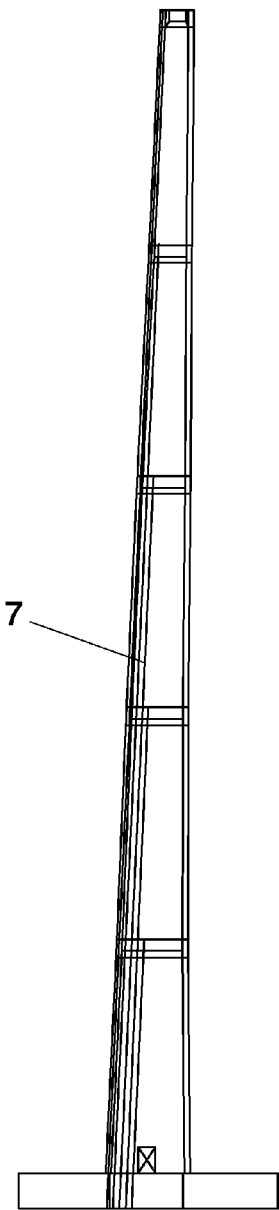
In FIG. 5C: Sectional view of the improved concrete modular tower structure for eolic turbines of FIG. 5B in which the fixation cables are represented in its working position inside the tower.
Figure 6C:
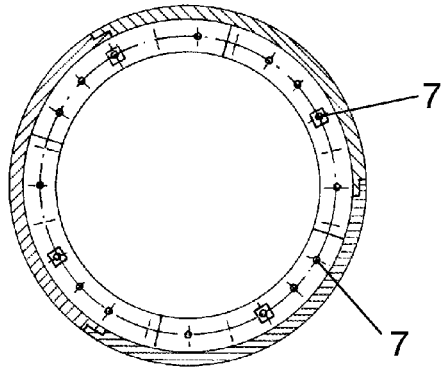
In FIG. 6C: Detailed view of a section of an improved concrete modular tower structure for eolic turbines and other applications with fixation cables, in accordance with an example embodiment of the present invention.
Figure 6F:
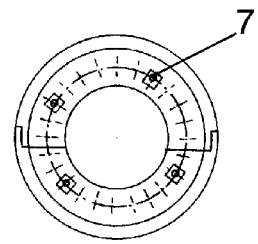
In FIG. 6F: Detailed view of a section of an improved concrete modular tower structure for eolic turbines and other applications with fixation cables, in accordance with an example embodiment of the present invention.
Figure 6B:
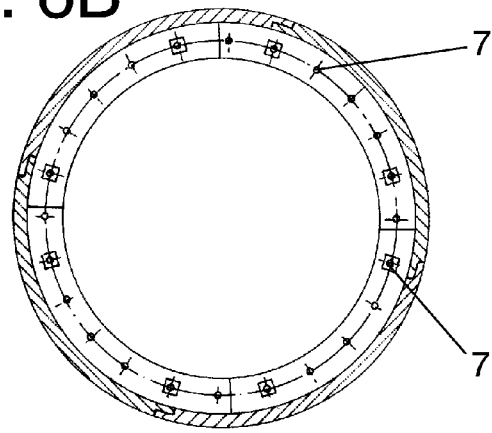
In FIG. 6B: Detailed view of a section of an improved concrete modular tower structure for eolic turbines and other applications with fixation cables, in accordance with an example embodiment of the present invention, in accordance with an example embodiment of the present invention.
Figure 6E:
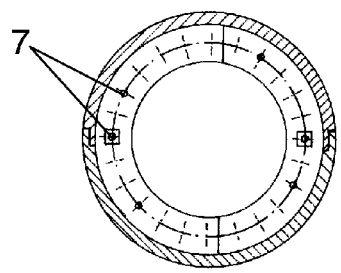
In FIG. 6E: Detailed view of a section of an improved concrete modular tower structure for eolic turbines and other applications with fixation cables, in accordance with an example embodiment of the present invention.
Figure 6A:
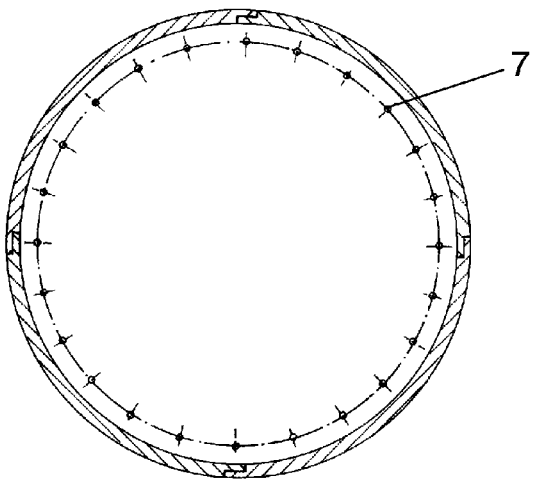
In FIG. 6A: Detailed view of a section of an improved concrete modular tower structure for eolic turbines and other applications with fixation cables, in accordance with an example embodiment of the present invention.
Figure 6D:
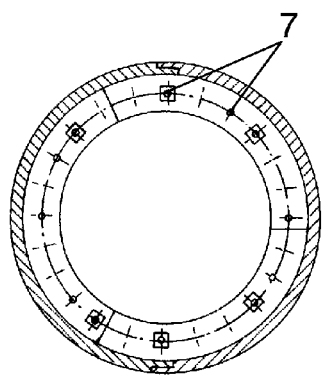
In FIG. 6D: Detailed view of a section of an improved concrete modular tower structure for eolic turbines and other applications with fixation cables, in accordance with an example embodiment of the present invention.
Figure 7:
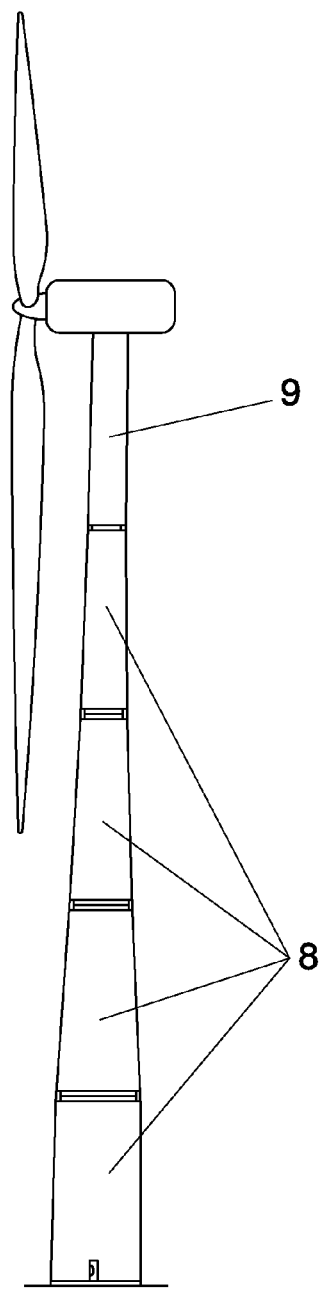
In FIG. 7: Side view of an improved concrete modular tower structure for eolic turbines showing a wind tower element connected to the first tower element.

Example embodiments of the present invention provide for improved concrete, metallic and/or mixed modular tower structures for eolic turbines and other applications, which may be made up of a plurality of prefabricated concrete, metallic and/or mixed elements, with surface textures that are smooth, rough or stamped, resulting from the idea of dividing the tower (1) through horizontal and vertical sections. Thus, the set of elements (2) is made up of prefabricated concrete, metallic and/or mixed elements which are partial segments (3) of a revolution surface with a straight or curved generatrix (outer shape of the tower) and may also be formed by linear concrete elements, either curved or straight, constituting a lattice inscribed in the aforementioned revolution surface. The prefabricated elements of size which decrease with the height, are susceptible of fitting one on top of the other making up a closed tower or an open lattice tower inscribed ideally in a truncated conical surface with straight or curved generatrix. The elements make up the different lengths in height of the tower that, in the case of a closed tower, each length is made up of a plurality of transversal sections: one-half section, one-third section, one-fourth section, one-fifth section, one-sixth section, one-seventh section, one-eighth section, etc. linked together by vertical and horizontal wet or dry joints or vertical half joints stitched together with pre-stressed bars through existing openings in the vertical rim. Each open lattice tower length is made up of a set of quasi-vertical linear elements and a ring of horizontal elements having a circular or polygonal directrix serving as bracing at the height of each horizontal joint between two successive lengths.

On the other hand, in this improved modular tower of concrete, metallic and/or mixed, for eolic turbines and other applications, the different tower lengths made up in this way are also linked together by means of flanges (5) made up of an interior rim (4) on the end edges, provided with a plurality of openings through which the fixing metallic bars pass.

Likewise, the different tower lengths made up in this way are also linked together by flanges (6) provided with a plurality of openings which are passed through by a set of metallic straps (7) between the flange of the length in question and the base or bedplate of the tower, the above mentioned straps passing through all the flanges of the intermediate lengths.

Additionally, the different tower lengths put together in this way are linked together by a system of steel bars projecting from one length, which are housed into channels left for this purpose in the other length, establishing the linking by filling the channels or casings with fluid, retraction-free, high-resistance mortar. Likewise, in addition to the aforementioned linking flanges or bars and casings systems between tower lengths, the contact rims adopt a dovetail shape.

On the other hand, in this improved concrete modular tower structure for eolic turbines and other applications, an open lattice is formed by prefabricated straight or curved linear elements which are linked to each other through a system of bars projecting from the quasi-vertical elements in one length, which pass through some passing channels in the horizontal elements, and are housed in channels or casings located in the quasi-vertical elements of the other length, linking the set by filling the casings with fluid, retraction-free, high-resistance mortar. Lastly, in this improved concrete modular tower structure for eolic turbines and other applications, the upper lengths may be metallic instead of prefabricated concrete. Finally, the shape, material and dimensions may vary and in general, everything which is accessory and auxiliary, provided that it does not change or modify the essence of the improvements herein described.

What is claimed is:

1. A tower structure, comprising:
a plurality of tower elements configured to be stacked vertically to form the tower structure;
a first tower element of the plurality of tower elements, the first tower element including a plurality of first pre-fabricated concrete tower segments fitted horizontally side by side in a first ring, each of the plurality of first pre-fabricated concrete tower segments having an outer surface which forms a portion of an outer perimeter of the first tower element; and
a second tower element of the plurality of tower elements, disposed below the first tower element, the second tower element including a plurality of second pre-fabricated concrete tower segments fitted horizontally side by side in a second ring, each of the plurality of second pre-fabricated concrete tower segments having an outer surface which forms a portion of an outer perimeter of the second tower element;
wherein the number of the plurality of first prefabricated concrete tower segments in the first tower element is smaller than the number of the plurality of second pre-fabricated concrete tower segments in the second tower element.

2. The tower structure of claim 1, wherein:
each of the first pre-fabricated concrete tower segments is fitted side by side to another first pre-fabricated concrete tower segment and joined together by concrete poured between the first pre-fabricated concrete tower segments.

3. The tower structure of claim 1, wherein the first tower element has a sectional area in a horizontal plane smaller than that of the second tower element.

4. The tower structure of claim 1, further comprising:
a wind energy turbine, connected to the first tower element;
wherein the plurality of tower elements are adapted to support the wind energy turbine.

5. The tower structure of claim 1, further comprising:
a plurality of flanges located in the plurality of tower elements, the plurality of flanges being provided with a plurality of openings, and
a plurality of metallic cables extending from a bedplate of a tower base and passing through the plurality of openings provided in the flanges located in the plurality of tower elements.

6. The tower structure of claim 1, wherein a surface of each of the plurality of first pre-fabricated concrete tower segments is shaped such that, when assembled into the first tower element, an outside of the first tower element is a curved surface.

7. The tower structure of claim 1, wherein each of the first pre-fabricated concrete tower segments includes a channel adapted to accommodate a joining element configured to join the segment with another segment in the plurality of first pre-fabricated concrete tower segments.

8. The tower structure of claim 1, wherein each of the first and second pre-fabricated concrete tower segments is comprised of steel reinforced concrete.

9. The tower structure of claim 8, further comprising a top tower element, of the plurality of tower elements, comprised of metal and disposed above the first tower element.

10. The tower structure of claim 1, wherein:
the first tower element further comprises a first flange; and
the second tower element further comprises a second flange;
wherein the first tower element and the second tower element are joined by a fastener passing through the first and second flange.

11. The tower structure of claim 10, wherein:
the first flange and the second flange have a dovetail shape facilitating the joining of the first and second tower elements.

12. The tower structure of claim 1, further comprising:
a plurality steel bars projecting from the first tower element; the projections of the plurality of steel bars housed in channels in the second tower element.

13. The tower structure of claim 12, wherein the channels are filled with retraction-free fluid and high resistance mortar.

14. The tower structure of claim 12 wherein the steel bars are corrugated.

15. A method of manufacturing components of a tower structure, the method comprising:
forming a plurality of first pre-fabricated concrete tower segments structured to comprise a first tower element when fitted horizontally side by side in a first ring, each of the plurality of first pre-fabricated concrete tower segments having an outer surface which forms a portion of an outer perimeter of the first tower element; and
forming a plurality of second pre-fabricated concrete tower segments structured to comprise a second tower element when fitted horizontally side by side in a second ring, each of the plurality of second pre-fabricated concrete tower segments having an outer surface which forms a portion of an outer perimeter of the second tower element,
wherein the first tower element is structured to comprise a first vertical section of a tower structure when assembled, and the second tower element is structured to comprise a second vertical section of a tower structure, disposed below the first tower element, when assembled, and
wherein the number of the plurality of first prefabricated concrete tower segments is smaller than the number of the plurality of second of pre-fabricated concrete tower segments.

16. The method of claim 15, wherein the tower structure is adapted for a wind energy turbine.

17. The method of claim 15, wherein the first tower element is formed with a sectional area in a horizontal plane smaller than that of the second tower element.

18. The method of claim 15, wherein:
the first tower element is formed with a first flange and the second tower is formed with a second flange; and
the first flange is adapted to accept a first fixation cable, passing through the second tower element and connected to a bedplate when assembled, and the second flange is adapted to accept a second fixation cable connected to the bedplate when assembled.

* * * * *